UNITED STATES PATENT OFFICE.

LOUIS BLANGEY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PIGMENT.

1,166,808. Specification of Letters Patent. Patented Jan. 4, 1916.

No Drawing. Application filed February 26, 1914. Serial No. 821,205.

*To all whom it may concern:*

Be it known that I, LOUIS BLANGEY, citizen of the Swiss Republic, residing at Mannheim, Germany, have invented new and useful Improvements in Pigments, of which the following is a specification.

My invention consists in a new composition of matter suitable for use as pigments or lakes.

I have discovered that compounds containing the general grouping:—

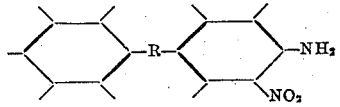

in which R is a poly-atomic group containing oxygen and containing less than 4 atoms, when mixed with a metal compound as substratum, such for instance, as alumina, blanc fixe, China clay, heavy spar or the like, yield valuable pigments or lakes possessing clear yellow shades, good coloring power and excellent fastness against the action of water, lime and alcohol. Moreover, they do not sublime and are with but few exceptions, completely insoluble in oil. They also possess excellent fastness against the action of light, and can be used for a great variety of purposes, for instance, for coloring paper or as oil paints, or for ordinary printing, or as lithographic colors.

As instances of compounds which are suitable for use according to my invention, I mention nitro-amino-benzophenone, nitro-amino-sulfobenzid, and derivatives of these compounds, substituted in either or both of the benzene rings, for instance, 3.3'-dinitro-4.4'-diamino-sulfobenzid, 3.3'-dinitro-4.4'-diamino-benzophenone, 3.3'-dinitro-4-chlor-4'-amino-benzophenone, 3.3'-dinitro-4-amino-4'-chlorsulfobenzid, 3.3'-dinitro-4-amino-benzo-phenone, 3.4'-dinitro-4-amino-benzophenone, 3-nitro-4-amino-4'-methoxy-benzophenone, 3-nitro-4-amino-4'-chlorbenzophenone, and 3-nitro-4-amino-2'.4'-dichlorbenzophenone.

The manufacture of the said pigments can be effected in various ways; for instance, the benzophenone derivative, or sulfobenzid derivative can be mixed either in the dry state or in the form of paste (obtainable, for instance, by precipitation from sulfuric acid solution by means of cold water and washing free from sulfuric acid) with the substratum, then filtered and dried and finished off as may be necessary.

The following examples will serve to illustrate further the nature of this invention, which, however, is not confined to these examples. The parts are by weight.

*Example 1—Pigment for lithographic purposes and three-color printing.*—Take an aqueous paste containing 5 parts of 3.3'-dinitro-4.4' diamino-sulfobenzid

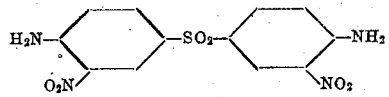

(see Ullmann and Korselt, *Berichte* 40, 646), and stir the said paste into 100 parts of a 4½% paste of aluminium hydrate. Then filter, dry and grind, the product.

*Example 2—Pigment for oil painting.*—Work up together 100 parts of heavy spar and a paste containing 5 parts of a mixture of 3.3'-dinitro-4.4' diamino-benzophenone and 3.3'-dinitro-4-chlor-4'-amino-benzophenone, which mixture can be obtained, for instance, by the action, under mild conditions, of ammonia on 3.3'-dinitro-4.4' dichlorbenzophenone.

*Example 3—Pigment for printing on paper.*—Stir together 10 parts of aluminium sulfate, 20 parts of heavy spar and a paste containing 5 parts of 3.3'-dinitro-4.4'-diamino-benzophenone and then add 5 parts of sodium carbonate.

The compounds which are used for the purpose of this invention can generally be obtained by heating the corresponding chlorin derivatives with ammonia, thus replacing the chlorin by $NH_2$.

Now what I claim is:—

1. The new composition of matter containing a metal compound as substratum and a compound possessing a grouping corresponding to the formula:—

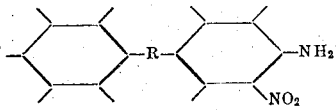

in which R is a polyatomic group containing oxygen and also containing less than 4 atoms, which composition of matter is adapted for use as a pigment, has a clear yellow shade, possesses good coloring power and is fast against the action of water, lime, alcohol and light.

2. The new composition of matter containing 3.3'-dinitro-4.4'-diamino-sulfobenzid and a metal compound as substratum, adapted for use as a pigment, having a yellow shade, possessing good coloring power and being fast against the action of water, lime, alcohol and light.

3. The new composition of matter containing 3.3'-dinitro-4.4'-diamino-sulfobenzid and aluminium hydrate, adapted for use as a pigment, having a yellow shade, possessing good coloring power and being fast against the action of water, lime, alcohol and light.

In testimony whereof I have hereunto set my hand in the presence of two subscribing witnesses.

LOUIS BLANGEY.

Witnesses:
J. ALEC. LLOYD,
S. S. BERGER.

Copies of this patent may be obtained for five cents each, by addressing the "Commissioner of Patents, Washington, D. C."